(12) United States Patent
Ishii et al.

(10) Patent No.: US 9,930,279 B2
(45) Date of Patent: Mar. 27, 2018

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventors: Mie Ishii, Tokyo (JP); Hirokazu Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 14/970,737

(22) Filed: Dec. 16, 2015

(65) Prior Publication Data

US 2016/0198109 A1  Jul. 7, 2016

(30) Foreign Application Priority Data

Jan. 5, 2015  (JP) ................................ 2015-000509

(51) Int. Cl.
| | |
|---|---|
| *H04N 5/3745* | (2011.01) |
| *H04N 5/369* | (2011.01) |
| *H04N 5/378* | (2011.01) |
| *H04N 5/347* | (2011.01) |

(52) U.S. Cl.
CPC ............. *H04N 5/378* (2013.01); *H04N 5/347* (2013.01); *H04N 5/3696* (2013.01); *H04N 5/37457* (2013.01)

(58) Field of Classification Search
None
See application file for complete search history.

(56) References Cited

U.S. PATENT DOCUMENTS

| | | | |
|---|---|---|---|
| 2001/0036361 A1* | 11/2001 | Suda ...................... | G03B 13/32 396/111 |
| 2013/0050554 A1* | 2/2013 | Mabuchi .............. | H04N 5/3745 348/311 |

FOREIGN PATENT DOCUMENTS

JP          3774597 B      5/2006

\* cited by examiner

*Primary Examiner* — Mark T Monk
(74) *Attorney, Agent, or Firm* — Cowan, Liebowitz & Latman, P.C.

(57) ABSTRACT

An image capturing apparatus includes a plurality of unit pixels that each have a plurality of photoelectric conversion portions, and are arranged in a matrix; a plurality of column output lines arranged for each column of the unit pixels; and a switching unit configured to switch between a first read out mode where signals that have been accumulated in the plurality of photoelectric conversion portions of a unit pixel are read out from respectively different column output lines, and a second read out mode where signals that have been accumulated in the plurality of photoelectric conversion portions of a unit pixel are combined and then read out from a single column output line.

11 Claims, 9 Drawing Sheets

IMAGE CAPTURING APPARATUS AND CONTROL METHOD THEREOF, AND STORAGE MEDIUM

BACKGROUND OF THE INVENTION

Field of the Invention

The present invention relates to an image capturing apparatus and a method for controlling the image capturing apparatus.

Description of the Related Art

In recent years, in the field of image capturing apparatuses employing a CMOS-type image sensor or the like, image capturing apparatuses have been proposed that can acquire not only an intensity distribution of light, but also an incident direction and distance information of light.

Japanese Patent No. 3774597 discloses technology whereby it is possible to perform focus point detection by a pupil division system. According to Japanese Patent No. 3774597, by dividing a photodiode (referred to below as a PD) of a unit pixel that corresponds to a single microlens into two photodiodes, it is possible for each PD to receive light of a different pupil plane of an image lens. Also, focus point detection is performed by comparing the output of two PDs. Also, by summing output signals from the two photodiodes that constitute the unit pixel, it is possible to obtain a normal shooting image.

Incidentally, in a case where each pixel has a plurality of PDs as in Japanese Patent No. 3774597, there is the problem that an increased amount of time is needed to read out signals from all PDs, so the frame rate decreases.

As a method for shortening the read out time of one frame, there is a method in which the pixels used for focus point detection are limited. For example, signals of divided PDs within a unit pixel are respectively read out only for a row used for focus point detection processing, and for a row not used for focus point detection processing, signals of divided PDs are summed and only a signal for image generation is read out, thus enabling an increase in read out time to be suppressed.

However, in this case, because the read out time differs between a row used for focus point detection processing and a row not used for focus point detection processing, in an ordinary slit rolling operation used as an operation when performing live view or moving image shooting, a phenomenon occurs that accumulation time, i.e. the amount of light exposure, differs by pixel row. Also, in the case of the driving method disclosed in Japanese Patent No. 3774597, because signals of divided PDs are read out at different times, there is also the problem that strictly speaking the timing of accumulation differs.

SUMMARY OF THE INVENTION

The present invention was made in consideration of the foregoing problems, and in an image sensor in which photodiodes of a unit pixel have been divided into a plurality of photodiodes, enables an image having a uniform amount of light exposure to be obtained while suppressing an increase in read out time.

According a first aspect of the present invention, there is provided an image capturing apparatus, comprising: a plurality of unit pixels that each have a plurality of photoelectric conversion portions, and are arranged in a matrix; a plurality of column output lines arranged for each column of the unit pixels; and a switching unit configured to switch between a first read out mode where signals that have been accumulated in the plurality of photoelectric conversion portions of a unit pixel are read out from respectively different column output lines, and a second read out mode where signals that have been accumulated in the plurality of photoelectric conversion portions of a unit pixel are combined and then read out from a single column output line.

According to a second aspect of the present invention, there is provided a method for controlling an image capturing apparatus having a plurality of unit pixels that each have a plurality of photoelectric conversion portions and are arranged in a matrix, and a plurality of column output lines arranged for each column of the unit pixels, the method comprising: switching between a first read out mode where signals that have been accumulated in the plurality of photoelectric conversion portions of a unit pixel are read out from respectively different column output lines, and a second read out mode where signals that have been accumulated in the plurality of photoelectric conversion portions of a unit pixel are combined and then read out from a single column output line.

According to a third aspect of the present invention, there is provided a computer-readable storage medium storing a program for causing a computer to execute a method for controlling an image capturing apparatus having a plurality of unit pixels that each have a plurality of photoelectric conversion portions and are arranged in a matrix, and a plurality of column output lines arranged for each column of the unit pixels, wherein the method includes switching between a first read out mode where signals that have been accumulated in the plurality of photoelectric conversion portions of a unit pixel are read out from respectively different column output lines, and a second read out mode where signals that have been accumulated in the plurality of photoelectric conversion portions of a unit pixel are combined and then read out from a single column output line.

Further features of the present invention will become apparent from the following description of exemplary embodiments with reference to the attached drawings.

DESCRIPTION OF THE EMBODIMENTS

Below, embodiments of the present invention will be described in detail with reference to the accompanying drawings.

(First Embodiment)

Figure 1:
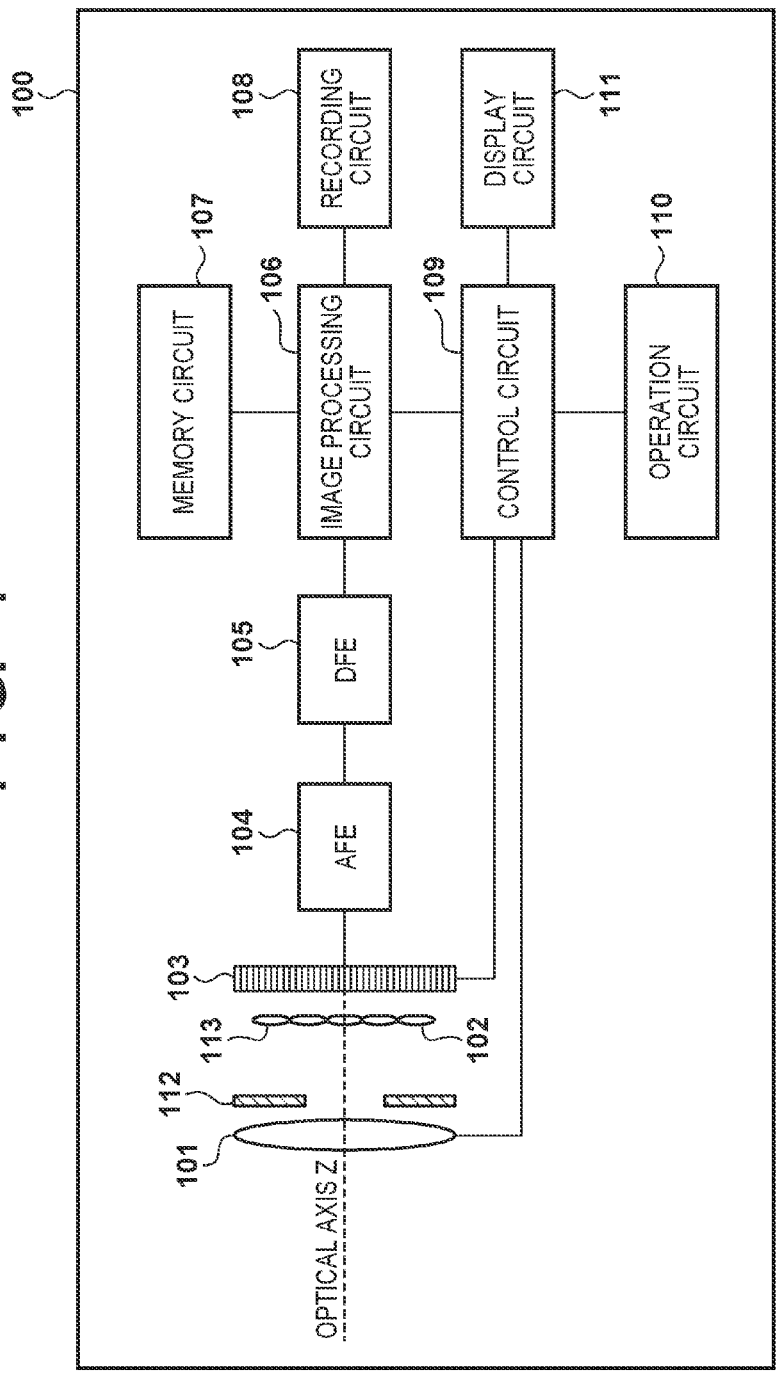
FIG. 1 is a block diagram that shows the configuration of an image capturing apparatus 100 according to an embodiment of the present invention.

FIG. 1 is a block diagram that shows the configuration of an image capturing apparatus 100 according to an embodiment of the present invention. In FIG. 1, a shooting optical system of the image capturing apparatus 100 includes a shooting lens 101 and an aperture 112. For an image of a photographic subject that has been formed with this shooting optical system, light is received with an image sensor 103 that has a microlens array 102. Light that passed through the shooting lens 101 forms an image near a focus point position of the shooting lens 101. The microlens array 102 is configured from a plurality of microlenses 113, and due to being arranged near the focus point position of the shooting lens 101, has a function of emitting light that passed through different pupil regions of the shooting lens 101 after dividing that light by pupil region. The image sensor 103 is a solid-state image sensor, of which a CMOS image sensor or a CCD image sensor are representative. Due to the image sensor 103 being arranged such that a plurality of pixels (photoelectric conversion portions) correspond to a single microlens 113, the image sensor 103 has a function of receiving light that has been emitted after being divided by pupil region with the microlens 113, while preserving division information, and converting that received light to an image signal on which data processing can be performed.

A signal that has been output from the image sensor 103 is processed with an analog signal processing circuit (AFE) 104, and a digital signal processing circuit (DFE) 105. The analog signal processing circuit 104 performs correlated double sampling processing, signal amplification, reference level adjustment, A/D conversion processing, and the like on an image signal output from the image sensor 103. The digital signal processing circuit 105 performs digital image processing such as reference level adjustment on an image signal output from the analog signal processing circuit 104.

An image processing circuit 106 performs processing on an image signal that has been output from the digital signal processing circuit 105. A memory circuit 107 and a recording circuit 108 are connected to the image processing circuit 106. Specifically, the image processing circuit 106 performs correlation calculation and focus point detection of an A-image and a B-image described later, and predetermined image processing and defect correction processing, and the like on an image signal that has been output from the digital signal processing circuit 105. The memory circuit 107 and the recording circuit 108 are a recording medium such as a non-volatile memory or a memory card that records and holds an image signal or the like that has been output from the image processing circuit 106.

Also, the image capturing apparatus 100 has a control circuit 109, and an operation circuit 110, a display circuit 111, and the image processing circuit 106 are connected to the control circuit 109. The control circuit 109 performs centralized driving and control of the entire image capturing apparatus, such as driving and control of the image sensor 103 and the image processing circuit 106. The operation circuit 110 receives a signal from an operation member installed in the image capturing apparatus 100, and transmits a user command to the control circuit 109. The display circuit 111 displays an image after shooting, a live view image, various settings screens, and the like.

Next is a description of the relationship between the shooting lens 101, the microlens array 102, and the image sensor 103, a pixel definition, and principles of focus point detection by a pupil division system, in the image capturing apparatus of the present embodiment.

Figure 2:
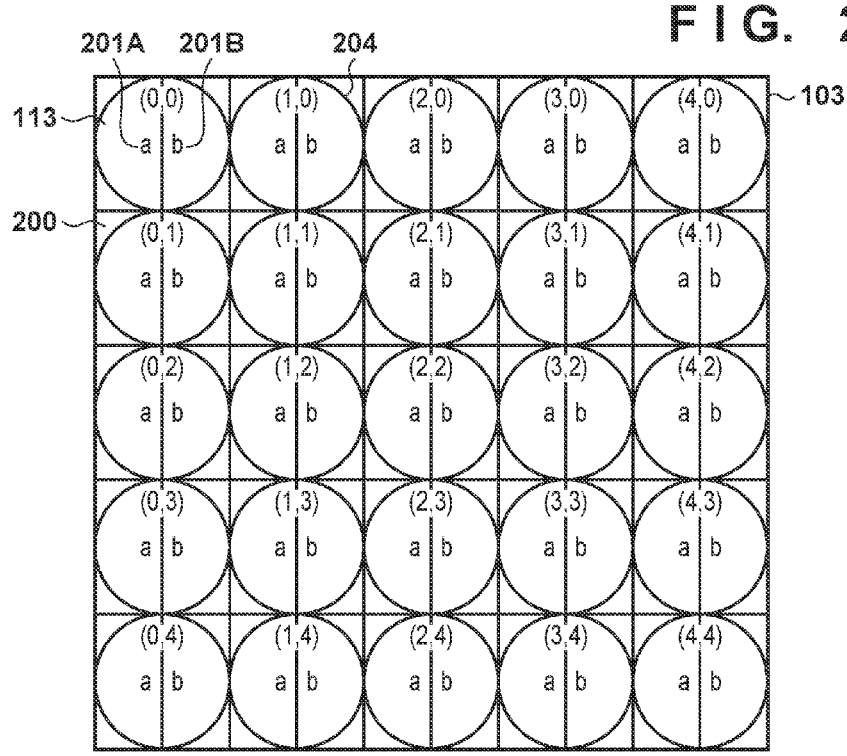
FIG. 2 is a pixel arrangement diagram of an image sensor.

In FIG. 2, the image sensor 103 and the microlens array 102 are viewed from the direction of optical axis Z in FIG. 1. In the present embodiment, an individual microlens 113 among the microlenses 113 that form the microlens array 102 is defined as one pixel, and this is considered a unit pixel 200. Also, a plurality of divided pixels (photoelectric conversion portions) 201 are arranged so as to correspond to the single microlens 113. Note that in the present embodiment, in the unit pixel 200, two of the divided pixels (photoelectric conversion portions) 201 are arranged in the X axis direction, and these are respectively defined as 201A and 201B. Note also that the number of divided pixels (photoelectric conversion portions) that correspond to a single microlens 113 is not limited to two divided pixels.

Figure 3:
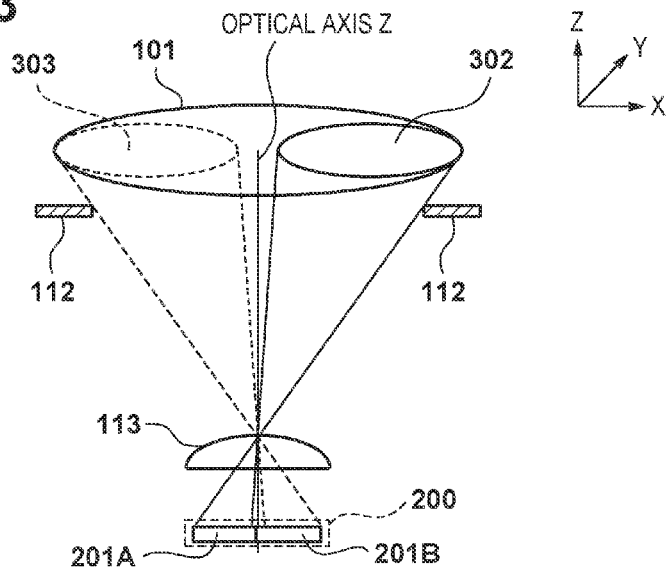
FIG. 3 is a concept diagram in which a light beam that exited from an exit pupil of a shooting lens is incident on a unit pixel.

FIG. 3 shows how light that was emitted from the shooting lens 101 passes through a single microlens 113 and is received by a unit pixel 200 of the image sensor 103, viewed from a direction (the Y axis direction) perpendicular to the optical axis Z. A light beam of the shooting lens 101 is regulated by the aperture 112. Light that has passed through an exit pupil of the shooting lens 101 is incident on the unit pixel 200, centered on the optical axis Z. As shown in FIG. 3, a light beam that passes through a pupil region 302 travels through the microlens 113 and is received by the divided pixel (photoelectric conversion portion) 201A, and a light beam that passes through a pupil region 303 travels through the microlens 113 and is received by the divided pixel (photoelectric conversion portion) 201B. Accordingly, the divided pixels 201A and 201B respectively receive light of different regions of the exit pupil of the shooting lens 101.

Signals of the divided pixels 201A that perform pupil division of light from the shooting lens 101 are acquired from the plurality of unit pixels 200 lined up in the X axis direction, and a photographic subject image constituted from a group of these output signals is used as an A-image. Likewise, signals of the divided pixels 201B that perform pupil division of light from the shooting lens 101 are acquired from the plurality of unit pixels 200 lined up in the X axis direction, and a photographic subject image constituted from a group of these output signals is used as a B-image.

Correlation calculation is performed on the A-image and the B-image to detect an image shift amount (pupil division phase difference). By further multiplying the image shift amount by a conversion coefficient determined from the focus point position of the shooting lens 101 and the optical system, it is possible to calculate a focus point position corresponding to an arbitrary photographic subject position within a screen. By controlling focus of the shooting lens 101 based on the focus point position information that was calculated here, an image capturing plane phase difference AF is possible. Also, by adding together an A-image signal and a B-image signal, and using the result as an A+B image signal, this A+B image signal can be used for a normal shooting image.

Figure 4:
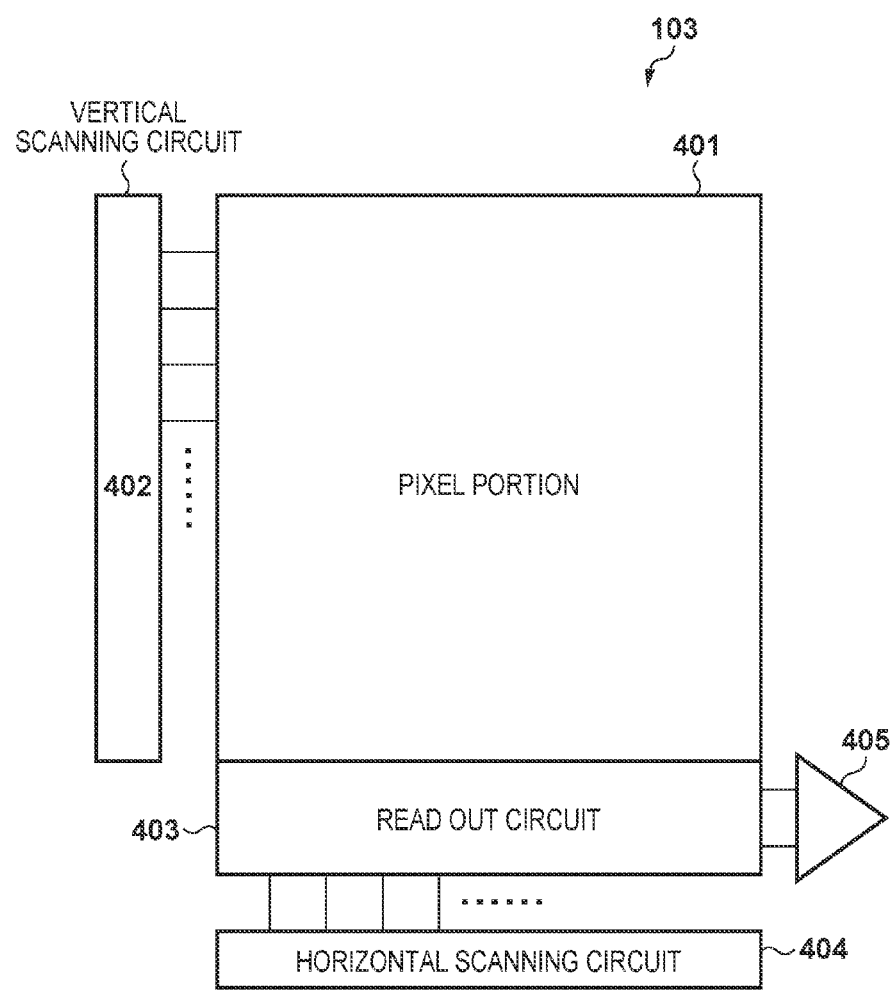
FIG. 4 is a block diagram that shows the configuration of an image sensor.

FIG. 4 is a block diagram that shows the configuration of the image sensor 103. The image sensor 103 has a pixel portion 401, a vertical scanning circuit 402, a read out circuit 403, a horizontal scanning circuit 404, and an output amp 405. In the pixel portion 401, a plurality of unit pixels are arranged in a matrix, and receive light of an optical image that has been formed by the shooting lens 101. The vertical scanning circuit 402, via a signal line configured to be connected to each row of the pixel portion 401, selects and drives a row. The horizontal scanning circuit 404, via a signal line configured to be connected to each column of the pixel portion 401, selects and drives a column. The read out circuit 403 reads out signals of pixels of a row selectable by the vertical scanning circuit 402, and the signals that have been read out are successively output outside of the image sensor 103 via the output amp 405 by driving of the horizontal scanning circuit 404.

Figure 5:
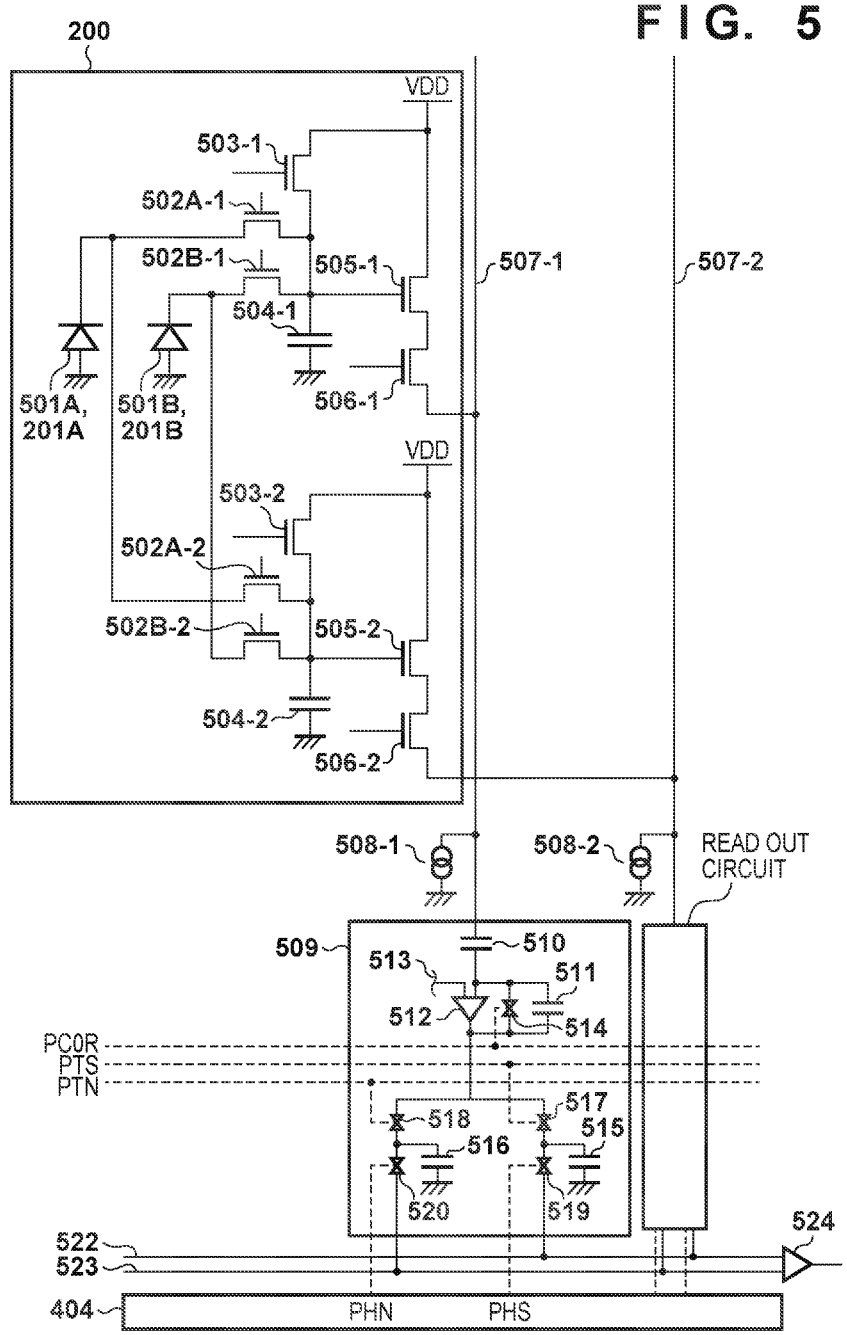
FIG. 5 illustrates a pixel circuit and a column circuit of an image sensor in a first embodiment.

FIG. 5 shows an example of a pixel circuit and a read out circuit of the CMOS-type image sensor 103 in the present embodiment. The unit pixel 200 has photodiodes (PDs) 501A and 501B that are photoelectric conversion portions. The PDs 501A and 501B respectively correspond to the divided pixels 201A and 201B, and receive an optical image that has been formed by the shooting lens 101, and generate and accumulate a charge. Transfer switches (transfer gates) 502A-1 and 502A-2, and 502B-1 and 502B-2, are configured with MOS transistors. A floating diffusion portion (referred to below as an FD) 504-1 is connected to the transfer switches 502A-1 and 502B-1. An FD 504-2 is connected to the transfer switches 502A-2 and 502B-2. The charge that has been accumulated by the PD 501A can be transferred to the FD 504-1 via the transfer switch 502A-1, and can be transferred to the FD 504-2 via the transfer switch 502A-2. Likewise, the charge that has been accumulated by the PD 501B can be transferred to the FD 504-1 via the transfer switch 502B-1, and can be transferred to the FD 504-2 via the transfer switch 502B-2.

The FDs 504-1 and 504-2 are respectively connected to reset switches 503-1 and 503-2, and source follower amps (referred to below as SFs) 505-1 and 505-2. Further, the SFs 505-1 and 505-2 are respectively connected to selection switches 506-1 and 506-2. The charge that has been transferred to the FDs 504-1 and 504-2 is temporarily held and converted to a voltage, then output from the SFs 505-1 and 505-2. The reset switches 503-1 and 503-2, and drains of the SFs 505-1 and 505-2, share a reference electric potential VDD. The reset switch 503-1 resets the electric potential of the FD 504-1, and resets the electric potential of the PDs 501A and 501B via the transfer switches 502A-1 and 502B-1, to the VDD. Also, the reset switch 503-2 resets the electric potential of the FD 504-2, and resets the electric potential of the PDs 501A and 501B via the transfer switches 502A-2 and 502B-2, to the VDD. The selection switches 506-1 and 506-2 respectively output pixel signals that have been output from the SFs 505-1 and 505-2 to column output lines 507-1 and 507-2. Note that in the present embodiment, a unit pixel is divided in two so there are two divided pixels, and as a result there are two column output lines, but in a case where a unit pixel is divided into four or more divided pixels, a plurality of column output lines may be arranged corresponding to the divided pixels.

The transfer switches, reset switches, and selection switches are respectively controlled by unshown signal lines PTX, PRES, and PSEL that are connected to the vertical scanning circuit 402. Constant current sources 508-1 and 508-2 are connected to the column output lines 507-1 and 507-2.

Next is a description of the circuit configuration of a column read out circuit 509. The column read out circuit 509 has a clamp capacitance C0 (510), a feedback capacitance Cf (511), an operation amp 512, a reference power source 513 that supplies a reference voltage Vref, and a switch 514 for shorting both ends of the feedback capacitance Cf. The switch 514 is controlled with a C0 reset signal PCOR. A capacitance CTS (515) and a capacitance CTN (516) are capacitances for holding a signal voltage. Switches 517 and 518 control writing to the capacitances. The switch 517 is controlled with a PTS signal, and the switch 518 is controlled with a PTN signal. Switches 519 and 520 receive signals from the horizontal scanning circuit 404, and output the signals to an output amp 524 via respective horizontal output lines 522 and 523. The switches 519 and 520 are respectively controlled with a PHS signal and a PHN signal of the horizontal scanning circuit 521.

Figure 6A:
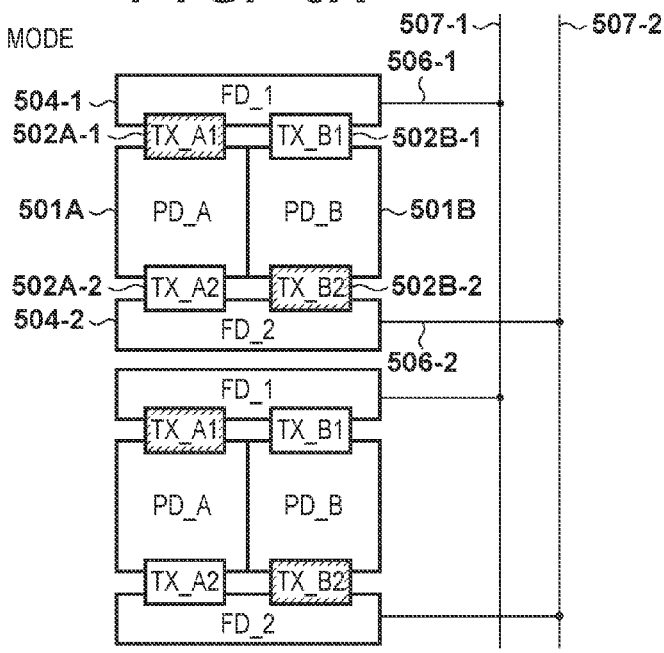
FIGS. 6A and 6B show examples of a signal read out operation of the image sensor in the first embodiment.
Figure 6B:
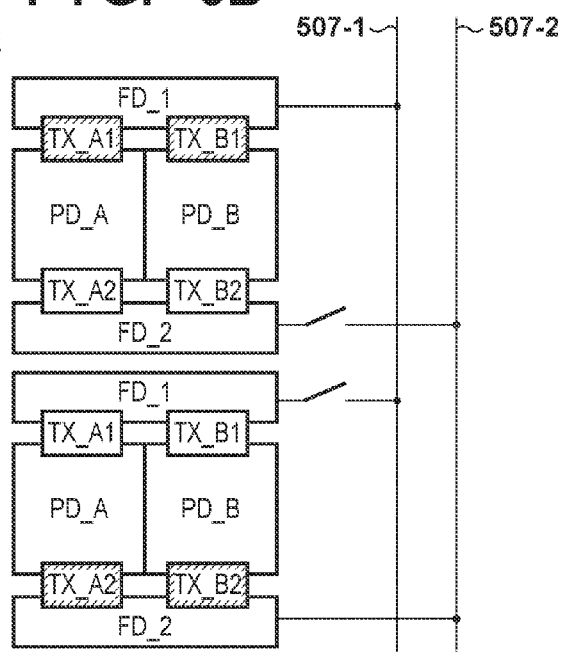

FIGS. 6A and 6B schematically show examples of a signal read out operation of a CMOS-type image sensor having the circuit configuration shown in FIG. 5. FIG. 6A shows an example of a read out operation in a first drive mode of the present embodiment. The first drive mode is driving that reads out signals corresponding to charges of the divided pixels (PDs 501A and 501B) respectively via separate column output lines, and is mainly used in a case of performing image capturing plane phase difference AF. The charge that has accumulated in a PD_A (501A) that is one photoelectric conversion portion of a unit pixel, by switching ON a transfer switch TX_A1 (502A-1), is transferred to an FD_1 (504-1) and converted to a voltage, and then output to the column output line 507-1. On the other hand, the charge that has accumulated in a PD_B (501B) that is the other photoelectric conversion portion of the unit pixel, by switching ON a transfer switch TX_B2 (502B-2), is transferred to an FD_2 (504-2) and converted to a voltage, and then output to the column output line 507-2. Note that the output signals of the PD_A and the PD_B that were read out via separate column output lines can also be summed with the image processing circuit 106 in a later stage and used as a captured image.

Next, FIG. 6B shows an example of a read out operation in a second drive mode of the present embodiment. The second drive mode is driving that combines charges of the divided pixels (PDs 501A and 501B) and reads out the result as output of a unit pixel via a vertical output line, and is mainly used in a normal shooting mode that generates a captured image. The charges that have accumulated in the PD_A (501A) and the PD_B (501B) of the unit pixel, by switching ON the transfer switch TX_A1 (502A-1) and the transfer switch TX_B1 (502B-1), are simultaneously transferred to the FD_1 (504-1) and converted to a voltage, and then output to the column output line 507-1. Note that in other rows, if the charges are simultaneously transferred to the FD_2 (504-2) by switching ON other transfer switches TX_A2 (502A-2) and TX_B2 (502B-2), and then output to the column output line 507-2, it is possible to simultaneously read out signals of pixels of two rows.

In the present embodiment, by control of the control circuit 109, the first drive mode is switched to when performing image capturing plane phase difference AF, and the second drive mode is switched to when performing only normal shooting that generates a shooting image without performing image capturing plane phase difference AF.

Figure 7:
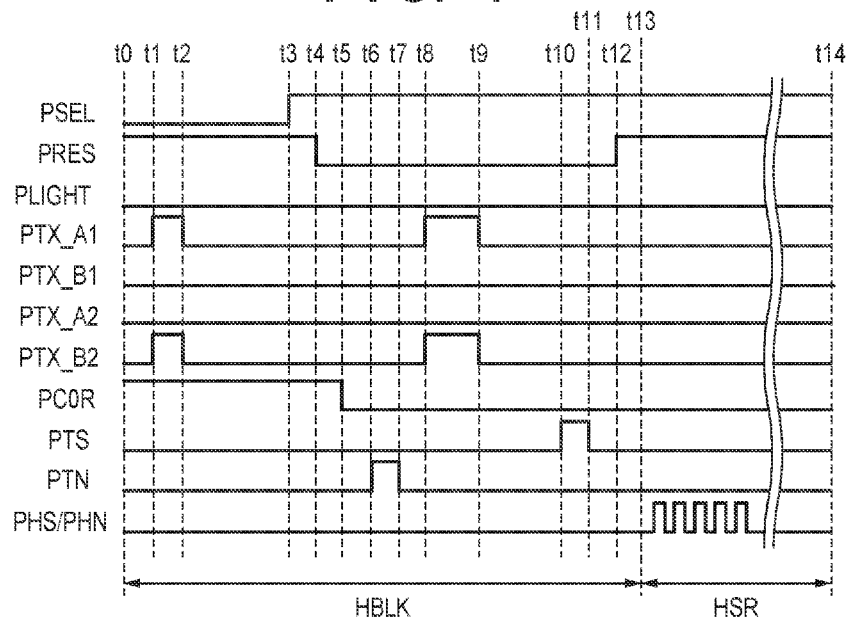
FIG. 7 is a timing chart that shows an example of a signal read out operation in a first drive mode of the image sensor in the first embodiment.

FIG. 7 is a timing chart that shows an example of a signal read out operation in the first drive mode shown in FIG. 6A. The signal read out operation will be described in detail with reference to the timing chart in FIG. 7.

First, in a state where a signal pulse PRES is Hi in a period of a vertical transfer time HBLK, the FDs 504-1 and 504-2 are reset (T=t0). At a time T=t1 signal pulses PTX_A1 and PTX_B2 are set to Hi, and the PDs 501A and 501B are reset. At a time T=t2 the signal pulses PTX_A1 and PTX_B2 are set to Lo, and charge accumulation of the PDs 501A and 501B starts. Here, the transfer switches that open/close for resetting are not limited to the switches used for charge transfer after charge accumulation, and in this example signal pulses PTX_A2 and PTX_B1 may be used.

At a time T=t3 after starting accumulation, a signal pulse PSEL is set to Hi, establishing an operation state of the SFs 505-1 and 505-2. At a time T=t4, the signal pulse PRES is set to Lo, thus releasing reset of the FDs 504-1 and 504-2. The electric potentials of the FDs 504-1 and 504-2 at this time are read out as reset signal levels (noise components) in the column output lines 507-1 and 507-2, and the result is input to the column read out circuit 509. In the column read out circuit 509, at a time T=t5 the signal pulse PCOR is set to Lo, and a reference voltage Vref output buffer of the operation amp 512 is released. Then, a signal pulse PTN is set to Hi at a time T=t6 and set to Lo at a time T=t7 to cause operation of the switch 518, thus writing the reset signal levels to the capacitance CTN 516.

Next, signal pulses PTX_A1 and PTX_B2 are set to Hi at a time T=t8 and set to Lo at a time T=t9 to transfer the light charges that have accumulated in the PDs 501A and 501B to the FDs 504-1 and 504-2. Electric potential fluctuations of the FDs 504-1 and 504-2 corresponding to the charge amount are read out as light signal levels (light component+noise component) in the column output lines 507-1 and 507-2, and are input to the column read out circuit 509. In the column read out circuit 509, a signal pulse PTS is set to Hi at a time T=t10 and set to Lo at a time T=t11 to cause operation of the switch 517, thus writing the light signal levels to the capacitance CTS 515.

Note that when writing signals to the CTS 515 and the CTN 516, the signals are output after reverse gain according to the ratio of the clamp capacitance C0 (510) and the feedback capacitance Cf 511 is applied to the signals. Afterward, at a time T=t12, the signal pulse PRES is set to Hi to set the FDs 504-1 and 504-2 to the reset state.

Next, the signals that were held in the CTS 515 and the CTN 516 in a horizontal transfer time HSR are read out by the horizontal scanning circuit 404. During the interval T=t13 to T=t14, for each column read out circuit 509, successive signal pulses PHS and PHN are set to Hi and Low to cause operation of the switches 519 and 520. Thus, the signals that were held in the CTS 515 and the CTN 516, through the horizontal output lines 522 and 523, are output as differential signal levels (light components) with the output amp 524.

Afterward, the above-described A-image and B-image correlation calculation can be performed on the signals of the PDs 501A and 501B to acquire defocus information. On the other hand, signals of the PDs 501A and 501B that were separately output may be summed or the like with a later stage circuit (such as the image processing circuit 106) for a shooting image.

Here, a signal of the PD 501A was read out via the column output line 507-1 and a signal of the PD 501B was read out via the column output line 507-2. However, by switching on the signal pulses PTX_A2 and PTX_B1, the respective signals may also be read out via opposite column output lines.

Figure 8:
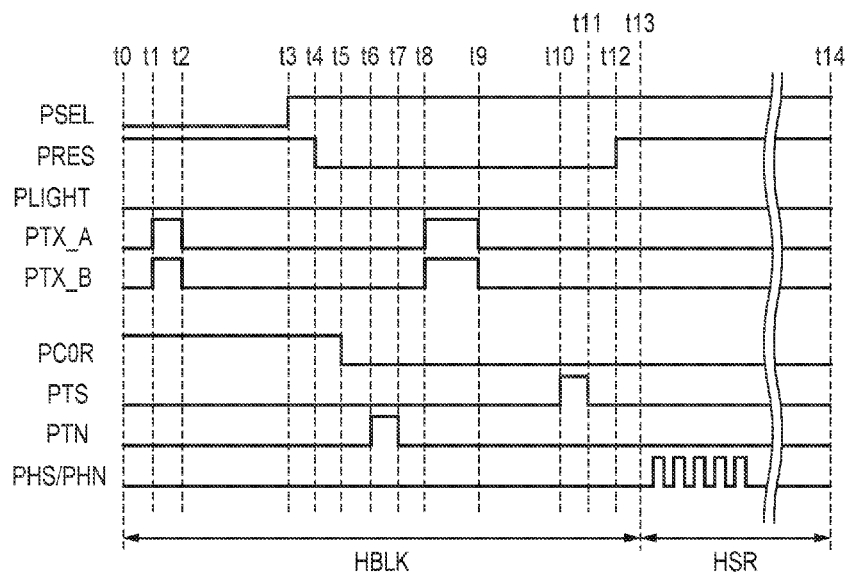
FIG. 8 is a timing chart that shows an example of a signal read out operation in a second drive mode of the image sensor in the first embodiment.

FIG. 8 is a timing chart that shows an example of a signal read out operation in the second drive mode shown in FIG. 6B. The signal read out operation will be described in detail with reference to the timing chart in FIG. 8.

Operation is about the same as in the first drive mode from times T=t0 to T=t7, so that description is omitted here. Also, the transfer switches, reset switch, and selection switches that are to be driven are configured to correspond to the FD and the column output line to which the charge of that pixel is to be transferred. For example, when using the column output line 507-1 for output, the transfer switches 502A-1 and 502B-1, the reset switch 503-1, and the selection switch 506-1 are driven. Below, an example case of performing output to the column output line 507-1 is described.

Next, signal pulses PTX_A1 and PTX_B1 are set to Hi at a time T=t8 and set to Lo at a time T=t9 to transfer the light charges that have accumulated in the PDs 501A and 501B to the FD 504-1. Electric potential fluctuation of the FD 504-1 corresponding to the charge amount is read out as a light signal level (light component+noise component) in the column output line 507-1, and is input to the column read out circuit 509. That is, the charges of the PDs 501A and 501B are combined and read out in the column output line 507-1 as output of the unit pixel. The signals that have been input to the column read out circuit 509 are output as differential signal levels (light components) with the output amp 524, by driving in the same manner as in the first drive mode.

Note that in the present embodiment, a signal is only read out from the column output line 507-1. However, it is also possible to read out signals from the column output line 507-2 by simultaneously driving the transfer switches 502A-2 and 502B-2, the reset switch 503-2, and the selection switch 506-2 in pixels of another row. Because it is possible to simultaneously read pixel signals of two rows, high speed read out is possible, and efficient read out is possible when performing normal shooting.

As shown in the timing charts in FIGS. 7 and 8, the time needed for one instance of horizontal read out, i.e. the sum of the vertical transfer time HBLK and the horizontal transfer time HSR, can be made the same for the first drive mode and for the second drive mode in which two rows are read simultaneously.

Based on the foregoing description, in an image capturing apparatus provided with a CMOS-type image sensor having a configuration whereby it is possible to perform focus point detection based on image capturing plane phase difference detection pixels, by reading out output of divided pixels of each of a plurality of column output lines provided in each column, it is possible to capture an image for performing image capturing plane phase difference AF while preserving simultaneous accumulation time. Also, in the normal shooting mode, pixel signals for two rows can be read simultaneously, so high speed read out is possible. Note that the driving described in the present embodiment is one example, and is not a limitation of the present invention.

(Second Embodiment)

Next is a description of a second embodiment of the present invention. The second embodiment is characterized by the configuration of pixels of the image sensor, and proposes an efficient layout for the image sensor.

Figure 9:
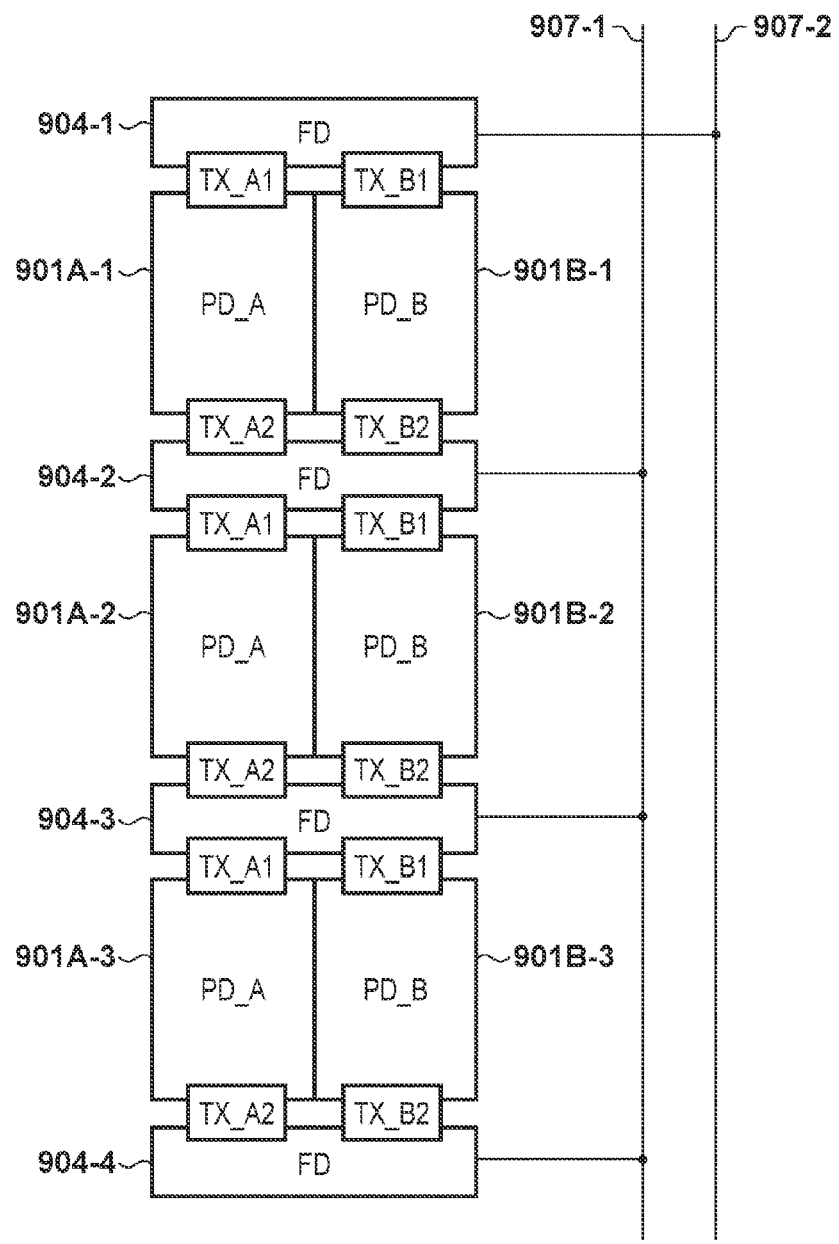
FIG. 9 illustrates a configuration of pixels of an image sensor in a second embodiment.

FIG. 9 is a schematic diagram that illustrates the configuration of pixels of the image sensor in the second embodiment. In this configuration, signals from a plurality of unit pixels can be transferred to a single FD, and pixels of adjacent rows (pixels adjacent in the column direction) share the FD. By adjacent rows sharing the FD, it is possible to realize driving that captures an image for performing image capturing plane phase difference AF while preserving simultaneous accumulation time, without providing two FDs for each unit pixel.

Next, an example read out operation in the first drive mode (image capturing plane phase difference AF image capturing mode) of the present embodiment, in the pixel configuration shown in FIG. 9, will be described. The charge that has accumulated in a PD_A (901A-1) of a unit pixel, by switching ON a transfer switch TX_A2, is transferred to an FD 904-2 and converted to a voltage, and then output to a column output line 907-1. On the other hand, the charge that has accumulated in a PD_B (901B-1), by switching ON a transfer switch TX_B1, is transferred to an FD 904-1 and converted to a voltage, and then output to the column output line 907-2. Note that the output of the PD_A and the PD_B that were read out via separate column output lines can also be summed with the image processing circuit 106 or the like in a later stage and used as a captured image.

Read out of a charge of a unit pixel configured from the PDs 901A-2 and 901B-2 is also performed in the same manner. For ease of processing performed in a later stage, here, an A-image signal is output from the column output line 907-1, and a B-image signal is output from the column output line 907-2. The charge that has accumulated in the PD_A (901A-2) of a unit pixel, by switching ON the transfer switch TX_A1, is transferred to the FD 904-2 and converted to a voltage, and then output to the column output line 907-1. On the other hand, the charge that has accumulated in the PD_B (901B-2), by switching ON the transfer switch TX_B2, is transferred to an FD 904-3 and converted to a voltage, and then output to the column output line 907-2. Similarly below, an A-image signal continues to be output from the column output line 907-1, and a B-image signal continues to be output from the column output line 907-2.

Next, an example read out operation in the second drive mode (normal shooting mode) of the present embodiment, in the pixel configuration shown in FIG. 9, will be described. The charges that have accumulated in the PD_A (901A-1) and the PD_B (901B-1) of the unit pixel, by switching ON the transfer switches TX_A1 and TX_B1, are transferred to the FD 904-1 and converted to a voltage, and then output to the column output line 907-2. Simultaneously, the charges that have accumulated in the divided PD_A (901A-2) and the PD_B (901B-2) of the unit pixel, by switching ON the transfer switches TX_A1 and TX_B1, are transferred to the FD 904-2 and converted to a voltage, and then output to the column output line 907-1. Thus, in the configuration of the second embodiment as well, it is possible to simultaneously read out pixel signals of two rows in the second drive mode. Note that the signal read out operation in the first and second drive modes is realized in the same manner as the operation described in the first embodiment. Also, in FIG. 9, each FD 904 is only connected to one column output line, but a configuration may also be adopted in which both column output lines are selectable.

(Third Embodiment)

Next is a description of a third embodiment of the present invention. In the first and second embodiments, two drive modes were described. In the image capturing plane phase difference AF image capturing mode (first drive mode), it is possible to acquire both information for image capturing plane phase difference AF and information for image capturing, but in comparison to the normal shooting mode, an increased amount of read out time is needed to capture one image, so frame rate decreases.

Consequently, in one frame, if a row read out in the image capturing plane phase difference AF mode (first drive mode) is mixed with a row read out in the normal shooting mode (second drive mode), it is possible to acquire AF information without decreasing the frame rate. Below, this mode is referred to as a row-selective image capturing plane phase difference AF mode.

Figure 10:
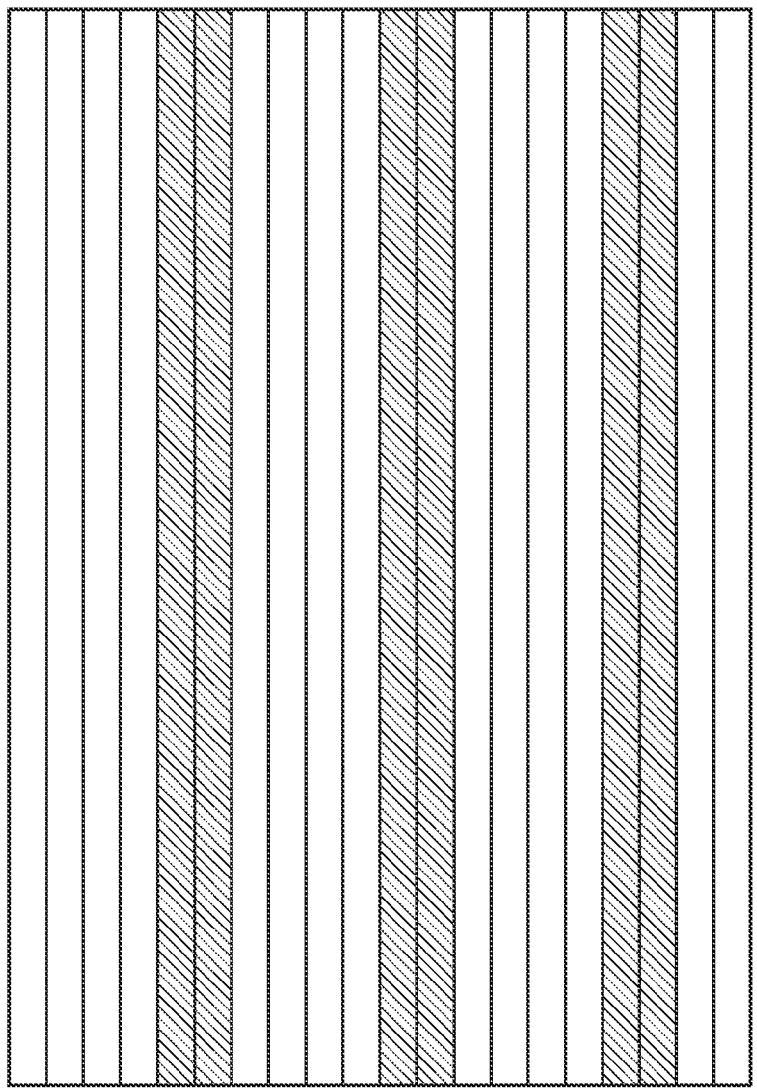
FIG. 10 shows an example of read out of pixel signals of an image sensor in a third embodiment.

FIG. 10 shows an example of how read out is performed in the row-selective image capturing plane phase difference AF mode in the third embodiment. FIG. 10 shows the read out mode in each row, and here, driving is performed such that four rows are read out in the second drive mode (normal shooting mode), then two rows are read out in the first drive mode (image capturing plane phase difference AF mode). The first drive mode and the second drive mode can be implemented according to the timing charts shown in FIGS. 7 and 8, described in the first embodiment.

Figure 11:
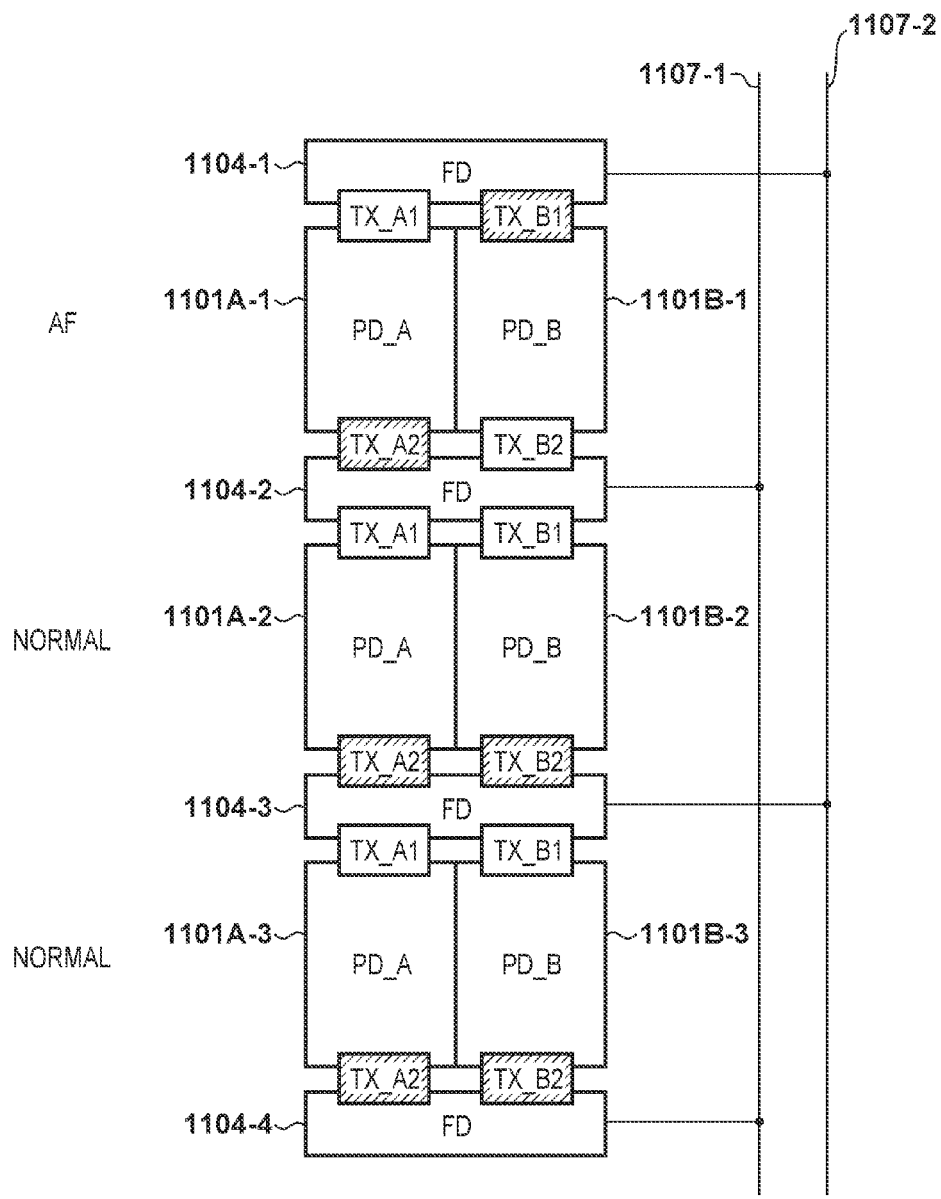
FIG. 11 shows an example of a signal read out operation of the image sensor in the third embodiment.

FIG. 11 is a schematic diagram that illustrates an example of a signal read out operation in the row-selective image capturing plane phase difference AF mode in the third embodiment. This corresponds to an example in which one row is read out in the first drive mode (image capturing plane phase difference AF mode) and two rows are read out in the second drive mode (normal shooting mode), corresponding to the sixth row to the eighth row in FIG. 10. The present embodiment is described based on an operation example in the configuration shown in FIG. 9, but the present embodiment can also be implemented in the configuration shown in FIGS. 6A and 6B.

Next is a description of an example read out operation in the first drive mode (image capturing plane phase difference AF image capturing mode) in the first row in FIG. 11. The charge that has accumulated in the PD_A (1101A-1) of a unit pixel, by switching ON the transfer switch TX_A2, is transferred to an FD 1104-2 and converted to a voltage, and then output to a column output line 1107-1. On the other hand, the charge that has accumulated in a PD_B (1101B-1), by switching ON the transfer switch TX_B1, is transferred to an FD 1104-1 and converted to a voltage, and then output to the column output line 1107-2. Note that the output of the PD_A and the PD_B that were read out via separate column output lines can also be summed with the image processing circuit 106 or the like in a later stage and used as a captured image.

Next is a description of an example read out operation in the second drive mode (normal shooting mode) in the second and third rows in FIG. 11. The charges that have accumulated in the PD_A (1101A-2) and the PD_B (1101B-2) of the unit pixel, by switching ON the transfer switches TX_A2 and TX_B2, are transferred to an FD 1104-3 and converted to a voltage, and then output to a column output line 1107-2. Also, simultaneously, the charges that have accumulated in the PD_A (1101A-3) and the PD B (1101B-3) of the unit pixel, by switching ON the transfer switches TX_A2 and TX_B2, are transferred to an FD 1104-4 and converted to a voltage, and then output to the column output line 1107-1.

Thus, it is possible to realize read out in such a manner that the first drive mode and the second drive mode have been mixed by row within a single frame. Note that the time needed for one instance of horizontal read out in the first drive mode and the second drive mode is the same as stated in the first embodiment. That is, also in the row-selective image capturing plane phase difference AF mode, in which the first drive mode and the second drive mode are mixed, it is possible to realize slit rolling operation without the accumulation time, i.e. the light exposure time, differing between rows.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-000509, filed Jan. 5, 2015, which is hereby incorporated by reference herein in its entirety.

What is claimed is:

1. An image capturing apparatus, comprising:
a plurality of unit pixels that ach have a plurality of photoelectric conversion portions, and are arranged in a matrix;
a plurality of column output lines arranged for each column of the unit pixels; and
a switching circuit that switches between a first mode where signals that have been accumulated in the plurality of photoelectric conversion portions of a unit pixel are output to respectively different column output lines, and a second mode where signals that have been accumulated in the plurality of photoelectric conversion portions of a unit pixel are combined and then output to a single column output line,
wherein focus detection is performed by detecting a phase difference of signals obtained from the plurality of photoelectric conversion portions and output to the different column output lines in the first mode, and capture images are generated using the combined signals output to the single column output line in the second mode.

2. The image capturing apparatus according to claim 1, wherein the unit pixel has at least two floating diffusion portions, and the plurality of photoelectric conversion portions of the unit pixel have transfer gates respectively connected to the at least two floating diffusion portions.

3. The image capturing apparatus according to claim 2, wherein each of the at least two floating diffusion portions is connected to respectively differing column output line among the plurality of column output lines.

4. The image capturing apparatus according to claim 1, wherein a floating diffusion portion is shared by two unit pixels that are adjacent in a column direction.

5. The image capturing apparatus according to claim 1, wherein the unit pixel has two photoelectric conversion portions and two floating diffusion portions and in the first read out mode, in the unit pixel, a charge that was accumulated by one photoelectric conversion portion, by driving one among two transfer gates of the one photoelectric conversion portion, is transferred to one among the two floating, diffusion portions, and a charge that was accumulated by the other photoelectric conversion portion, by driving one among two transfer gates of the other photoelectric conversion portion, is transferred to another among the two floating diffusion portions.

6. The image capturing apparatus according to claim 1, wherein the unit pixel has two photoelectric conversion portions and two floating diffusion portions, and in the second read out mode, in the unit pixel, charges that were accumulated by the two photoelectric conversion portion by driving one among two transfer gates of each of the photoelectric conversion portions, are transferred to one among the two floating diffusion portions, and the charges are combined at the floating diffusion portion where the charges were transferred.

7. The image capturing apparatus according to claim 6, wherein in the second read out mode, a charge that was accumulated by two photoelectric conversion portions of a first unit pixel is transferred to a floating diffusion portion positioned between the first unit pixel and a second unit pixel that is adjacent in a column direction to the first unit pixel, and a charge that was accumulated by two photoelectric conversion portions of the second unit pixel is transferred to a floating diffusion portion positioned between the second unit pixel and a third unit pixel that is adjacent in a column direction to the second unit pixel, and signals of two rows that are adjacent can be read out simultaneously.

8. The image capturing apparatus according to claim 1, wherein the first read out mode and the second read out mode are switched by row within a single frame.

9. The image capturing apparatus according to claim 1, wherein the unit pixel has two photoelectric conversion portions, and focus point detection can be performed by detecting a phase difference of image signals obtained from the two photoelectric conversion portions.

10. A method for controlling an image capturing apparatus having a plurality of unit pixels that each have a plurality of photoelectric conversion portions and are arranged in a matrix, and a plurality of column output lines arranged for each column of the unit pixels, the method comprising:
switching between a first mode where signals that have been accumulated in the plurality of photoelectric conversion portions of a unit pixel are output to respectively different column output lines, and a second mode where signals that have been accumulated in the plurality of photoelectric conversion portions of a unit pixel are combined and then output to a single column output line,
wherein focus detection is performed by detecting a phase difference of signals obtained from the plurality of photoelectric conversion portions and output to the different column output lines in the first mode, and capture images are generated using the combined signals output to the single column output line in the second mode.

11. A non-transitory computer-readable storage medium storing a program for causing a computer to execute a method for controlling an image capturing apparatus having a plurality of unit pixels that each have a plurality of photoelectric conversion portions and are arranged in a matrix, and a plurality of column output lines arranged for each column of the unit pixels, wherein the method includes switching between a first mode where signals that have been accumulated in the plurality of photoelectric conversion portions of a unit pixel are output to respectively different column output lines, and a second mode where signals that have been accumulated in the plurality of photoelectric conversion portions of a unit pixel are combined and then output to a single column output line, wherein focus detection is performed by detecting a phase difference of signals obtained from the plurality of photoelectric conversion portions and output to the different column output lines in the first mode, and capture images are generated using the combined signals output to the single column output line in the second mode.

* * * * *